(12) United States Patent
Murakami et al.

(10) Patent No.: US 8,388,226 B2
(45) Date of Patent: Mar. 5, 2013

(54) DYNAMIC BEARING DEVICE

(75) Inventors: Kazutoyo Murakami, Kuwana (JP); Masaki Egami, Kuwana (JP); Eiichiro Shimizu, Kuwana (JP); Kenji Ito, Kuwana (JP); Fuminori Satoji, Kuwana (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 13/425,083

(22) Filed: Mar. 20, 2012

(65) Prior Publication Data

US 2012/0175984 A1 Jul. 12, 2012

Related U.S. Application Data

(62) Division of application No. 11/659,079, filed as application No. PCT/JP2005/014034 on Aug. 1, 2005.

(30) Foreign Application Priority Data

Aug. 3, 2004 (JP) ................................ 2004-226229
Aug. 3, 2004 (JP) ................................ 2004-227022

(51) Int. Cl.
*F16C 17/10* (2006.01)
*F16C 35/02* (2006.01)

(52) U.S. Cl. ......... 384/107; 384/111; 384/114; 384/118

(58) Field of Classification Search .................. 384/107, 384/111, 112, 113, 114, 115, 118, 120
See application file for complete search history.

(56) References Cited

U.S. PATENT DOCUMENTS

| | | | | |
|---|---|---|---|---|
| 5,731,373 A | * | 3/1998 | Hirose et al. | ................. 524/447 |
| 6,390,681 B1 | | 5/2002 | Nakazeki et al. | |
| 7,147,376 B2 | * | 12/2006 | Shimizu et al. | ............... 384/107 |
| 2004/0017954 A1 | | 1/2004 | Komori et al. | |

FOREIGN PATENT DOCUMENTS

| | | |
|---|---|---|
| JP | 8-100817 A | 4/1996 |
| JP | 9-059514 A | 3/1997 |
| JP | 10-17770 * | 1/1998 |
| JP | 10-159854 A | 6/1998 |
| JP | 11-132225 A | 5/1999 |
| JP | 11-211285 A | 8/1999 |
| JP | 2000-291648 A | 10/2000 |
| JP | 2001-181522 A | 7/2001 |
| JP | 2002-061641 A | 2/2002 |
| JP | 2003-172336 A | 6/2003 |
| JP | 2003-301834 A | 10/2003 |
| JP | 2003-314534 A | 11/2003 |
| JP | 2004-011721 A | 1/2004 |
| JP | 2004-052999 A | 2/2004 |

OTHER PUBLICATIONS

International Search Report of PCT/JP2005/014034, date of mailing Nov. 8, 2005.

(Continued)

*Primary Examiner* — William C Joyce
(74) *Attorney, Agent, or Firm* — Westerman, Hattori, Daniels & Adrian, LLP

(57) ABSTRACT

A dynamic bearing device allows production of a smaller housing at low cost and suppresses ion elution from the resin portion to thereby maintain cleanliness in the dynamic bearing device and exert a desired bearing performance. A dynamic bearing device 1 is equipped with a bearing sleeve 8 fixed to the inner periphery of the housing 7, and a rotary member rotatable relative to the bearing sleeve 8 and the housing 7, in which the rotary member is supported in the radial direction and the thrust direction in a non-contact manner by a dynamic pressure action of a lubricant fluid generated in a bearing clearance. The housing 7 is formed by injection molding of a resin composition containing polyphenylene sulfide (PPS) as the base resin and PAN type carbon fibers as a filler.

6 Claims, 9 Drawing Sheets

OTHER PUBLICATIONS

International Preliminary Report on Patentability and Written Opinion issued in International Application No. PCT/JP2005/014034 (With filing date of Jan. 8, 2005).

U.S. Office Action dated Feb. 17, 2012 in related U.S. Appl. No. 11/659,079.

* cited by examiner

FIG. 5(a)

| | FIBER DIAMETER[μm] | AVERAGE FIBER LENGTH[μm] | ASPECT RATIO | TENSILE STRENGTH[MPa] |
|---|---|---|---|---|
| PAN TYPE CARBON FIBER No.1 | 7 | 6000 | 857 | 3240 |
| PAN TYPE CARBON FIBER No.2 | 7 | 150 | 21 | 3600 |
| Pich TYPE CARBON FIBER No.1 | 10 | 6000 | 600 | 2400 |

FIG. 5(b)

[単位:vol%]

| | EXAMPLE | | | | COMPARATIVE EXAMPLE | | | | |
|---|---|---|---|---|---|---|---|---|---|
| | 1 | 2 | 3 | 4 | 1 | 2 | 3 | 4 | 5 |
| LINEAR TYPE PPS | 90 | 75 | 70 | | 95 | 60 | | | |
| CROSS-LINKED TYPE PPS No.1 | | | | 70 | | | | | |
| CROSS-LINKED TYPE PPS No.2 | | | | | | | 70 | | |
| PES | | | | | | | | 70 | |
| PC | | | | | | | | | 70 |
| PAN TYPE CARBON FIBER No.1 | | | 25 | 25 | 5 | 40 | 25 | 25 | 25 |
| PAN TYPE CARBON FIBER No.2 | 10 | | | | | | | | |
| Pich TYPE CARBON FIBER No.1 | | 25 | | | | | | | |
| PTFE | | | 5 | 5 | | | 5 | 5 | 5 |

FIG. 6

| ITEM | EXAMPLE | | | | COMPARATIVE EXAMPLE | | | | |
|---|---|---|---|---|---|---|---|---|---|
| | 1 | 2 | 3 | 4 | 1 | 2 | 3 | 4 | 5 |
| Na ION CONTENT[ppm] | 285 | 241 | 263 | 1030 | 279 | 256 | 2127 | 311 | 284 |
| Na ION ELUTION AMOUNT[$\mu$g/cm$^2$] | <0.01 | <0.01 | <0.01 | <0.01 | <0.01 | GROOVES CAN NOT BE FORMED | 0.03 | <0.01 | <0.01 |
| JUDGMENT | ○ | ○ | ○ | ○ | ○ | — | × | ○ | ○ |
| VOLUME RESISTANCE [$\Omega \cdot$cm] | $4 \times 10^5$ | $6 \times 10^6$ | $1 \times 10^1$ | $2 \times 10^1$ | $3 \times 10^8$ | $9 \times 10^{-1}$ | $3 \times 10^1$ | $5 \times 10^2$ | $4 \times 10^2$ |
| JUDGMENT | ○ | ○ | ○ | ○ | × | ○ | ○ | ○ | ○ |
| OIL RESISTANCE[%] (TENSILE STRENGTH REDUCTION RATIO) | 9.8 | 9.1 | 8.7 | 7.3 | 8.9 | 6.1 | 7.6 | 9.1 | 13.3 |
| JUDGMENT | ○ | ○ | ○ | ○ | ○ | ○ | ○ | ○ | × |
| RING WEAR DEPTH[$\mu$m] | 2.7 | 2.4 | 2.2 | 2.5 | 5.9 | 2.9 | 2.6 | 3.7 | 6.4 |
| ASSOCIATED MEMBER WEAR DEPTH[$\mu$m] | 1.4 | 1.5 | 1.4 | 1.4 | 1.1 | 3.8 | 1.6 | 1.5 | 1.8 |
| JUDGMENT | ○ | ○ | ○ | ○ | × | × | ○ | × | × |
| GENERAL JUDGMENT | ○ | ○ | ○ | ○ | × | × | × | × | × |

FIG. 10

|  | MIXING EXAMPLE | | | | | | COMPARATIVE EXAMPLE | | | | | |
|---|---|---|---|---|---|---|---|---|---|---|---|---|
|  | 1 | 2 | 3 | 4 | 5 | 6 | 1 | 2 | 3 | 4 | 5 | 6 |
| PPS | 53 | 61 | 61 |  |  | 53 | 73 | 69 | 43 |  | 87 |  |
| PEEK |  |  |  | 61 |  |  |  |  |  |  |  | 49 |
| PA |  |  |  |  | 61 |  |  |  |  | 43 |  |  |
| CARBON FIBER | 40 |  |  |  |  | 3 |  |  |  |  |  | 50 |
| ALUMINUM BORATE WHISKER |  | 30 | 30 | 30 | 30 |  | 20 | 20 | 50 | 50 | 10 |  |
| ZINC OXIDE WHISKER |  |  |  |  |  | 37 |  |  |  |  |  |  |
| CARBON BLACK | 6 | 8 | 8 | 8 | 8 | 6 | 6 | 10 | 6 | 6 | 2 |  |
| PTFE | 1 | 1 | 1 | 1 | 1 | 1 | 1 | 1 | 1 | 1 | 1 | 1 |
| FORMABILITY | ○ | ○ | ○ | ○ | ○ | ○ | ○ | △ | △ | △ | ○ | △ |
| COEFFICIENT OF LINEAR EXPANSION | ○ | ○ | ○ | ○ | ○ | ○ | △ | ○ | ○ | ○ | △ | ○ |
| STATIC ELECTRICITY REMOVING PROPERTY | ○ | ○ | ○ | ○ | ○ | ○ | × | △ | ○ | ○ | × | ○ |
| EXPANSION | ○ | ○ | ○ | ○ | ○ | ○ | ○ | ○ | × | × | ○ | × |

FIG. 11

| | MIXING EXAMPLE | | | | COMPARATIVE EXAMPLE | | | | | |
|---|---|---|---|---|---|---|---|---|---|---|
| | 7 | 8 | 9 | 10 | 7 | 8 | 9 | 10 | 11 | 12 |
| PPS | 69 | | | 53 | 73 | 69 | 43 | | 87 | 49 |
| PEEK | | 74 | | | | | | | | |
| PA | | | 74 | | | | | 43 | | |
| CARBON FIBER | 30 | 20 | 20 | 10 | 20 | 20 | 50 | 50 | 10 | 50 |
| ALUMINUM BORATE WHISKER | | | | 30 | | | | | | |
| ZINC OXIDE WHISKER | | | | | | | | | | |
| CARBON BLACK | | 5 | 5 | 6 | 6 | 10 | 6 | 6 | 2 | |
| PTFE | 1 | 1 | 1 | 1 | 1 | 1 | 1 | 1 | 1 | 1 |
| FORMABILITY | ○ | ○ | ○ | ○ | ○ | △ | △ | △ | ○ | △ |
| COEFFICIENT OF LINEAR EXPANSION | ○ | ○ | ○ | ○ | △ | △ | ○ | ○ | △ | ○ |
| STATIC ELECTRICITY REMOVING PROPERTY | ○ | ○ | ○ | ○ | × | △ | × | ○ | × | ○ |
| EXPANSION | ○ | ○ | ○ | ○ | ○ | △ | × | × | ○ | × |
| WEAR RESISTANCE | ○ | ○ | ○ | ○ | × | × | × | × | △ | × |

DYNAMIC BEARING DEVICE

CROSS-REFERENCE TO RELATED APPLICATION

This application is a Divisional of application Ser. No. 11/659,079, filed Aug. 21, 2008, and wherein application Ser. No. 11/659,079 is a national stage application filed under 35 USC §371 of International Application No. PCT/JP2005/014034, filed Aug. 1, 2005, which further claims priority of Japanese Application No. 2004-226229, filed Aug. 3, 2004 and Japanese Application No. 2004-227022, filed Aug. 3, 2004, the entire contents of which are incorporated herein by reference.

BACKGROUND OF THE INVENTION

1. Field of the Invention

The present invention relates to a dynamic bearing device. This dynamic bearing device are suitable as a bearing device for use in a spindle motor of an information apparatus, for example, a magnetic disc apparatus, such as an HDD, an optical disc apparatus, such as a CD-ROM, a CD-R/RW, or a DVD-ROM/RAM, or a magneto-optical disc apparatus, such as an MD or an MO, a polygon scanner motor for a laser beam printer (LBP), a color wheel for a projector, or a small motor for an electric apparatus, such as an axial flow fan.

2. Description of the Related Art

Apart from high rotational accuracy, an improvement in speed, a reduction in cost, a reduction in noise, a reduction in weight, etc. are required of the motors as mentioned above. One of the factors determining such requisite performances is the bearing supporting the spindle of the motor. Recently, as a bearing of this type, use of a dynamic bearing superior in the above requisite performances is being considered, or such a dynamic bearing has been actually put into practical use.

JP 2002-061641 A discloses an example of the dynamic bearing as mentioned above which is equipped with a radial bearing portion supporting a rotary member having a shaft portion and a flange portion in the radial direction in a non-contact manner and a thrust bearing portion supporting the rotary member in the thrust direction in a non-contact manner. In a dynamic bearing device of this type, dynamic pressure grooves as dynamic pressure generating means are provided in the inner peripheral surface of a bearing sleeve constituting the radial bearing portion or in the outer peripheral surface of the shaft portion. Further, dynamic pressure grooves are provided in both end surfaces of a flange portion constituting the thrust bearing portion, or in surfaces opposed thereto (e.g., the end surfaces of the bearing sleeve, and an end surface of the bottom portion of a housing).

The housing is usually equipped with a cylindrical side portion and a bottom portion provided at one end of the side portion. The bottom portion is fixed to the inner periphery at one end of the side portion as a bottom member separate from the side portion; alternatively, it is formed integrally with the side portion. This is mainly formed of metal. For less expensive formation thereof, JP 2003-314534 A discloses a dynamic bearing equipped with a housing formed of resin.

Further, for example, in a spindle motor for an apparatus for driving a recording disk, such as a hard disk, there is used a dynamic bearing device which is equipped with a radial bearing portion supporting a rotary member in the radial direction in a non-contact manner by a dynamic pressure action of a lubricant fluid generated in a radial bearing clearance between the rotary member and a bearing sleeve, and a thrust bearing portion supporting the rotary member in the thrust direction in a non-contact manner by a dynamic pressure action of the lubricant fluid generated in a thrust bearing clearance between a housing and the rotary member (see, for example, JP 2000-291648 A). Further, the apparatus for driving a recording disk, such as a hard disk, is used in a relatively wide temperature range, so that a lubricant fluid of low evaporation rate and low viscosity is suitable for a dynamic bearing device to be used in the spindle motor of such a recording disk driving apparatus. For example, an ester type lubricating oil is used (see, for example, JP 2003-172336 A).

High machining precision and high assembly precision are required of the components of a dynamic bearing device, including the housing, in order to secure a high rotation performance as required with the recent increasing improvement of information apparatuses. Further, as the information apparatuses undergo a reduction in size and weight, a reduction in size and weight of the dynamic bearing devices is also required. At the same time, the requirement for a reduction in the cost of a dynamic bearing device is becoming increasingly severe.

Further, an ester type lubricating oil used in a dynamic bearing device of this type contains an ester group and thus has high reactivity with other components. Thus, there is a fear of a product generated through the reaction of the resin material forming the housing with the lubricating oil causing denaturing degeneration in the lubricating oil or a deterioration in the cleanliness of the bearing device.

Further, the resin housing is formed usually through injection molding of a resin material, which generates a gas (out gas) in a high temperature atmosphere. In particular, in the case of a bearing device to be used in an apparatus for driving a recording disk, such as a hard disk, the out gas generated in the high temperature atmosphere causes a deterioration in the cleanliness of the bearing device or the recording disk driving apparatus, such as contamination of the surface of the hard disk.

SUMMARY OF THE INVENTION

It is accordingly an object of the present invention to achieve a further improvement in the precision of and a further reduction in the weight and cost of a housing of a non-contact type dynamic bearing device.

Another object of the present invention is to secure the cleanliness of the bearing device by forming the housing of a dynamic bearing device of this type of a resin material having high oil resistance and low out gas property.

In order to achieve the above-mentioned object, the present invention provides a housing for a dynamic bearing device which accommodates a bearing sleeve forming a radial bearing clearance with an outer peripheral surface of a shaft portion, in which the housing is formed of a resin composition containing polyphenylene sulfide (PPS) as a base resin.

In this construction, the material of the housing, which has entirely been a metal material, is replaced by a resin composition, whereby a reduction in weight is achieved. Further, being formed of a resin composition, the housing allows injection molding, so that, as compared with the case in which the housing is entirely formed by machining, it is possible to achieve an improvement in productivity and a reduction in cost.

It is desirable for the base resin of the resin composition to be the one superior in mechanical strength, oil resistance, water absorption resistance, heat resistance, etc.

Examples of a preferable base resin include: polyphenylene sulfide (PPS), polyetheretherketone (PEEK), polyethersulfone (PES), polyphenylsulfone (PPSF), and polyamideimide (PAI). Above all, taking into account the fluidity in the molten state, polyphenylene sulfide (PPS) is particularly preferable.

Incidentally, polyphenylene sulfide (PPS), which is produced through polymerization of paradichlorobenzene (PDCB) and sodium sulfide, involves, in this process, generation of a salt, such as NaCl as a byproduct, which is mixed with the polyphenylene sulfide (PPS). Thus, during use of the dynamic bearing device, Na ions may be eluted into the lubricating oil from the resin portion formed by using this resin as the base resin. When Na ions are eluted into the lubricating oil, denaturing degeneration and a change in viscosity of the lubricating oil are caused, which may lead to a deterioration in the performance of the device. In view of this, in the present invention, the Na ion content of the resin component using polyphenylene sulfide (PPS) as the base resin is suppressed to a level not higher than 2000 ppm. As an example of the base resin of a resin composition meeting this condition, a linear type polyphenylene sulfide may be mentioned. By using this, NaCl, etc., which is a byproduct of polyphenylene sulfide (PPS), is reduced, and the amount of Na ions contained in the polyphenylene sulfide (PPS) is reduced. Thus, the amount of Na ions eluted into the lubricating oil is suppressed, and the cleanliness of the interior or the exterior of the bearing is maintained, thereby preventing a deterioration in bearing performance.

Apart from the above-mentioned requisite characteristics, high strength and impact resistance characteristic are required of the housing for a dynamic bearing device with the recent trend to make electronic apparatuses portable. Further, in accordance with down sizing of electronic apparatuses, high dimensional stability is required from the viewpoint of controlling the radial bearing clearance and the thrust bearing clearance with high accuracy. In view of this, in the present invention, carbon fibers as a filler are mixed with the polyphenylene sulfide (PPS) as the base resin. Due to this arrangement, an enhancement in the strength of the housing is achieved, and dimensional changes with temperature changes of the resin portion are suppressed. As a result, it is possible to control with high accuracy the radial bearing clearance and the thrust bearing clearance in use, thus ensuring the bearing performance. Further, carbon fibers have conductivity; thus, by mixing them with the base resin as a filler, it is possible to endow the shaft member with high conductivity. As a result, it is possible to dissipate the static electricity, with which the rotary side member (e.g., the disc hub) is charged during use, to the grounding side member through the housing.

Out of the above-mentioned requisite characteristics, it is preferable for carbon fibers to have tensile strength of 3000 Mpa or more since the housing is required of particularly high strength. Further, carbon fibers having high strength and high conductivity include polyacrylonitrile (PAN type) carbon fibers.

The reinforcing effect, the dimension stabilizing effect, the static electricity removing effect, etc. exerted by mixing the carbon fibers with the base resin can be exerted more conspicuously by taking into account the aspect ratio of the carbon fibers. That is, the larger the fiber length of the carbon fibers, the more enhanced the reinforcing effect and the static electricity removing effect, whereas, the smaller the fiber diameter, the more enhanced the wear resistance and the more it is possible to suppress, in particular, the damage of the associated member on which sliding is effected. From these viewpoints, specifically, it is desirable for the aspect ratio of the carbon fibers to be 6.5 or more.

It is desirable for the filling amount of the carbon fibers as the filler with respect to the base resin to be 10 to 35 vol %. When, for example, the filling amount is less than 10 vol %, the reinforcing effect and the static electricity removing effect due to the filling of the carbon fibers cannot be exerted to a sufficient degree, whereas, when the filling amount exceeds 35 vol %, it is rather difficult to ensure the formability of the housing.

When performing molding, it is necessary to take into consideration the melting viscosity of the molten resin (resin composition) injected into the mold. It should be noted, in particular, that as an apparatus for driving a recording disk, such as a hard disk, is reduced in size, the dynamic bearing device to be incorporated in such a driving apparatus is also reduced in size. That is, the housing is also reduced in size. In particular, minute dynamic pressure grooves may be formed in the upper end surface and the inner bottom surface of the housing; in that case, dimensional precision directly influences the performance of the product. Thus, the resin composition is required to exhibit low melting viscosity when supplied into the mold (cavity). From these points of view, it is desirable for the melting viscosity of the resin composition to be not more than 500 Pa·s at a temperature of 310° C. and a shear rate of 1000 $s^{-1}$. Here, the temperature of 310° C. corresponds to the temperature of the molten resin in the melting cylinder of the injection molding machine. This arrangement makes it possible to fill the region in the cavity corresponding to the resin portion with molten resin with high precision, thus maintaining the requisite formability.

The above-mentioned housing can be provided as a dynamic bearing device equipped with this housing, a radial bearing portion rotatably supporting the shaft member in a non-contact manner in the radial direction by the dynamic pressure action of a fluid, and a thrust bearing portion rotatably supporting the shaft member in a non-contact manner in the thrust direction by the dynamic pressure action of a fluid. It is desirable for this dynamic bearing device to be provided as a motor having a dynamic bearing device, a rotor magnet, and a stator coil generating a magnetic force between itself and the rotor magnet for use in the above-mentioned information apparatus; in particular, it is suitable for use in a magnetic disk drive device for a hard disk (HDD) or the like.

Further, in order to achieve the above-mentioned object, in the present invention, in a dynamic bearing device including: a housing having an integral or separate bottom portion; a bearing sleeve fixed to an inner periphery of the housing; and a rotary member rotatable relative to the bearing sleeve and the housing, the rotary member being supported in a radial direction and a thrust direction in a non-contact manner by a dynamic pressure action of a lubricant fluid generated in a bearing clearance, the lubricant fluid is an ester type lubricating oil, and the housing is formed of a resin material containing as a base one of the following materials: polyetheretherketone (PEEK), polyphenylene sulfide (PPS), polyamide (PA), thermoplastic polyimide (TPI), and polybutylene terephthalate (PBT).

In the present invention, as the base resin material for the housing, polyetheretherketone (PEEK), polyphenylene sulfide (PPS), polyamide (PA), thermoplatic polyimide (TPI), and polybutylene terephthlate (PBT) are selected. These resins are crystalline resins of high crystallinity, so the mutual action between the molecular chains is strong, making it difficult for a low-viscosity ester type lubricating oil to permeate the resin. Thus, by forming the housing of a resin material using one of these resins as the base, it is possible to impart high oil resistance with respect to an ester type lubricating oil to the housing. Further, the above resin materials are advantageous in that the amount of out gas generated mainly during solidification is small; in addition, they have superior properties, such as low water absorbency and high heat resistance, so that, by forming the housing of one of the above-mentioned resin materials, it is possible to suppress the amount of out gas generated during or after the molding of the housing, and it is possible to suppress dimensional changes in the housing due to water absorption. Further, it is possible to obtain a housing that can withstand the temperature rise within the bearing during the motor drive.

When forming the housing 7 of one of the above-mentioned resin materials, it is absolutely necessary to mix a filler with the resin material for the purpose of reinforcement. In particular, taking into consideration the fact that the apparatus for driving a recording disk, such a hard disk, is used in wide temperature range, it is important to minimize the dimensional changes with the temperature changes. In view of this, in the present invention, carbon fibers and inorganic fibers are selected as the filler to be mixed with the resin material forming the housing. Carbon fibers and inorganic fibers have a lower coefficient of linear expansion as compared with that of the resin material, so that it is possible to suppress the dimensional changes with the temperature changes in the resin molding (housing) in which carbon fibers and inorganic fibers are mixed as the filler, thus achieving an improvement in dimensional stability. Of course, the carbon fibers and inorganic fibers also function as reinforcing materials, so that, by mixing those with the resin material, it is possible to obtain the effect of reinforcing the resin housing. Such dimension stabilizing effect and reinforcing effect can be exerted to a sufficient degree by mixing 15 wt % or more in total of the filler with the resin material. When the total amount of the filler exceeds 50 wt %, the fluidity of the resin material in the mold becomes, for example, insufficient, thus adversely affecting the formability of the resin molding (housing). Thus, it is advisable to suppress the total amount of the filler to a level not larger than 50 wt %.

When carbon fibers are used as the filler, a conspicuous effect in enhancing the wear resistance is to be observed, so that it is desirable to mix carbon fibers as the filler with the resin material forming the member of the housing (sliding member), in particular, which is required to exhibit sliding property with respect to the rotary member, for example, the resin material forming the bottom portion and the opening of the housing. To obtain the requisite wear resistance, the mixing ratio of the carbon fibers must be at least 5 wt % or more.

Incidentally, the housing, which is formed by injection molding of a resin material, may trap some of the air in the mold when pouring the resin material into the mold. Usually, a mold is equipped with a gas vent for removing the air in the mold to facilitate the filling. With this gas vent, however, it is impossible to discharge the air trapped in the resin material to the exterior. Thus, the air remaining in the resin material stays inside the resin molding, generating voids and swelling in the molding. To solve this problem, the housing is caused to contain 1 wt % or more of carbon fibers. Due to this arrangement, the air inside the resin material is discharged to the exterior of the molding along the interface portion between the carbon fibers exposed through the surface of the resin molding and the resin around those carbon fibers, so that it is possible to prevent generation of voids in the molding and swelling of the molding, thus achieving an improvement in terms of the formability of the resin molding.

From what has been discussed above, it is desirable for the mixing amount of the carbon fibers in the filler to be at least 1 wt % or more, and, in particular, 5 wt % or more when wear resistance is to be taken into consideration.

On the other hand, when the mixing ratio of the carbon fibers exceeds 35 wt %, the expandability of the housing is reduced, so that, when, for example, some other member (bottom plate, seal member or the like) is press-fitted to the housing, the housing does not easily expand, thus impairing the operability. Thus, for such uses, it is desirable for the ratio of the carbon fibers contained in the housing to be not more than 35%. Even when the expandability of the housing is of no concern, if the mixing ratio of the carbon fibers exceeds 40 wt %, the formability is greatly deteriorated, so that it is desirable for the mixing amount of the carbon fibers to be not more than 40 wt %.

It is also possible to use carbon fibers alone as the filler. This, however, leads to an increase in the use amount of carbon fibers, which are expensive, resulting in a disadvantage from the economic point of view. Thus, also from the economic viewpoint, it is desirable to mix inorganic fibers including a whisker, which is an acicular single crystal, as a filler apart from carbon fibers. In particular, of the housing, the member (structural material) of which no slidability is required, allows use of a filler which contains no carbon fibers and whose main component are inorganic fibers. When the mixing ratio of the inorganic fibers exceeds 40 wt %, a deterioration in formability is invited likewise, so that it is desirable for the mixing amount of the inorganic fibers to be not more than 40 wt %.

Of the filler, it is desirable for the inorganic fibers to contain no silicon (Si). When silicon is contained, there is a fear of gasified organic Si being re-crystallized in or around the bearing device to adhere, for example, to the disk surface or the head portion; inorganic fibers containing no silicon involve no such problem, making it possible to maintain a still higher level of cleanliness in and around the bearing device.

The housing of a bearing device for use in a spindle motor for an apparatus for driving a recording disk, such as a hard disk, is required to have conductivity for dissipating the static electricity generated during motor drive to the ground therethrough. When, as stated above, the filler contains carbon fibers, if their average fiber length is 500 μm or more, the carbon fibers themselves have sufficient conductivity, so that it is possible to secure the requisite conductivity for the housing. However, when the average fiber length exceeds 500 μm, the carbon fibers are cut into fine pieces when re-melted by a screw at the time of recycle use (recycling of the resin material remaining on and sticking to the mold runner and spool), resulting in a deterioration in reinforcing function. This problem can be solved by mixing a powdered conductifying agent as a filler.

Examples of the powdered conductifying agent that can be used include carbon black, carbon nanomaterial, and metal powder; of these, carbon black is particularly preferable from the viewpoint of diffusibility in the resin material, low out gas property, the small degree of deterioration in conductivity when recycled, etc. It is desirable for carbon black to be mixed in a resin molding such as a housing in an amount of 2 to 10 wt %. When the mixing amount of the carbon black is less than 2 wt %, the carbon black does not sufficiently function as the conductifying agent in the resin molding, and when the mixing amount exceeds 10 wt %, a problem in terms of the formability of the resin molding is involved.

When the resin molding formed of a resin material mixed with such a filler includes a portion to be welded to another component, the upper limit of the total amount of the filler is set to 35 wt %. This makes it possible to secure a sufficient welding force with respect to another component while maintaining the formability and dimensional stability of the resin molding.

As described above, according to the present invention, it is possible to produce a housing of a smaller size and a lighter weight at low cost. Further, by suppressing ion elution from the resin portion, the cleanliness of the dynamic bearing device is maintained, whereby it is possible to exert a desired bearing performance in a stable manner for a long period of time.

Further, according to the present invention, it is possible to form the housing of a resin material using as the base a resin having high oil resistance and low out gas property, whereby it is possible to maintain a high level of cleanliness in a bearing device and in a disk drive apparatus in which this bearing device is incorporated. Further, by forming the housing of a resin material mixed with an appropriate amount of filler, such as carbon fibers, inorganic fibers, or carbon black according to the use, it is possible to obtain a housing superior in formability, dimensional stability, and static electricity removing property.

BRIEF DESCRIPTION OF THE DRAWINGS

FIGS. 5A and 5B are tables showing the compositions of specimens prepared for comparison test;

FIG. 6 is a table showing evaluation results in terms of the requisite characteristics of housings;

FIG. 10 is a table showing the results of a comparison test regarding the requisite characteristics of housings; and FIG. 11 is a table showing the results of a comparison test regarding the requisite characteristics of housings.

DESCRIPTION OF THE PREFERRED EMBODIMENTS

Herein below, embodiments of the present invention will be described with reference to the drawings.

Figure 1:
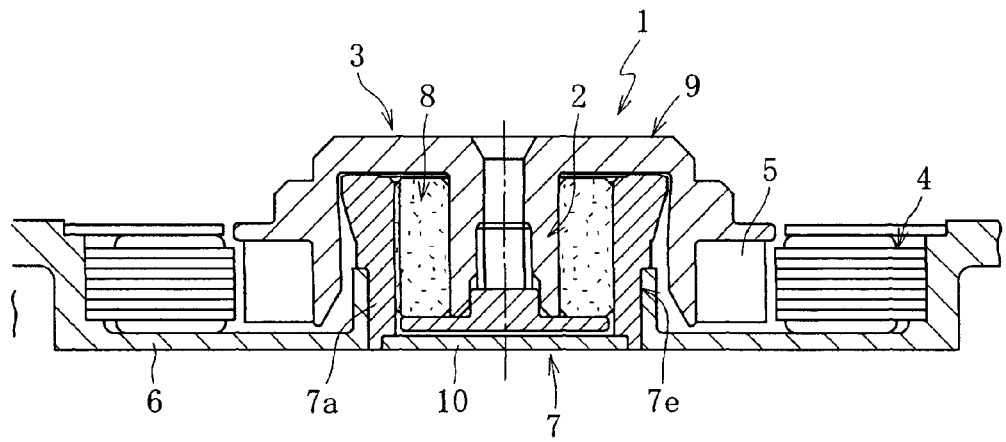
FIG. 1 is a sectional view of an information apparatus spindle motor in which a dynamic bearing device according to a first embodiment of the present invention is incorporated.

FIG. 1 conceptually shows an example of the construction of a spindle motor for an information apparatus with a dynamic bearing device 1, according to a first embodiment of the present invention, incorporated therein. This spindle motor for an information apparatus is used in a disc drive device, such as an HDD, and contains the dynamic bearing device 1 rotatably supporting a rotary member 3 having a shaft portion 2 in a non-contact manner, a stator coil 4 and a rotor magnet 5 that are opposed to each other through the intermediation of a radial gap, for example, and a motor bracket (retaining member) 6. The stator coil 4 is mounted to the outer periphery of the motor bracket 6, and the rotor magnet 5 is mounted to the outer periphery of the rotary member 3. The dynamic bearing device 1 has a housing 7 fixed to the inner periphery of the motor bracket 6, by means such as press-fitting. The rotary member 3 retains one or a plurality of disc-like information recording medium D, such as magnetic discs. When the stator coil 4 is energized, the rotor magnet 5 is rotated by a magnetic force generated between the stator coil 4 and the rotor magnet 5, whereby the rotary member 3 and the shaft portion 2 rotate integrally.

Figure 2:
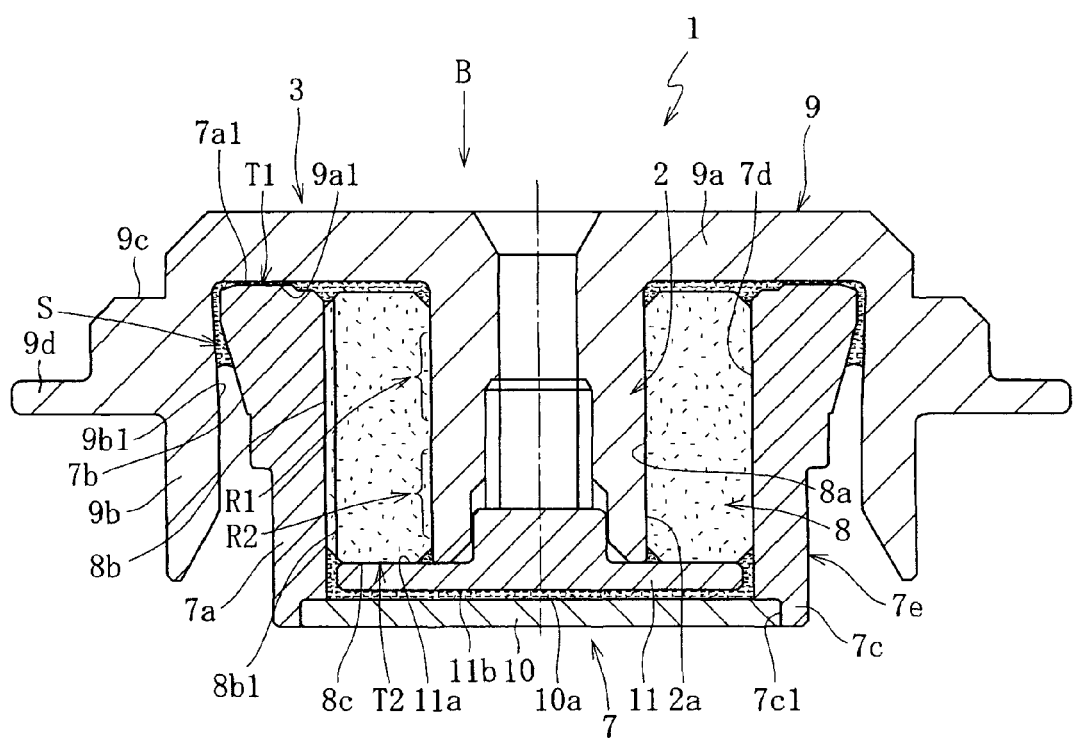
FIG. 2 is a sectional view of the dynamic bearing device of the first embodiment.

As shown, for example, in FIG. 2, the dynamic bearing device 1 is equipped with the housing 7, a bottom member 10 covering and sealing one end of the housing 7, a bearing sleeve 8 fixed inside the housing 7, and the rotary member 3 adapted to rotate relative to the housing 7 and the bearing sleeve 8. In the following description, for the sake of convenience, the side of the housing 7 covered with the bottom member 10 will be referred to as the lower side, and the side opposite thereto will be referred to as the upper side.

The rotary member 3 is composed, for example, of a hub portion 9 capping the upper side of the housing 7, and the shaft portion 2 inserted into the inner periphery of the bearing sleeve 8.

The hub portion 9 is equipped with a disc-shaped plate portion 9a covering the upper side of the housing 7, a cylindrical portion 9b extending axially downwards from the outer peripheral portion of the plate portion 9a, a disk mounting surface 9c provided in the outer periphery of the cylindrical portion 9b, and a flange portion 9d. A disk-like information recording medium (not shown) is fitted onto the outer periphery of the plate portion 9a, and is placed on the disk mounting surface 9c. The disk-like information recording medium is retained on the hub portion 9 by appropriate retaining means (not shown).

In this embodiment, the shaft portion 2 is formed integrally with the hub portion 9, and, at the lower end of the shaft portion 2, there is provided a separate flange portion 11 serving as a detachment preventing means. The flange portion 11 is formed of metal, and is fixed to the shaft portion 2 by connecting means, such as a screw.

The bearing sleeve 8 is formed in a cylindrical configuration using a porous material formed of, for example, a sintered metal, in particular, a sintered metal whose main component is copper.

Figure 3A:
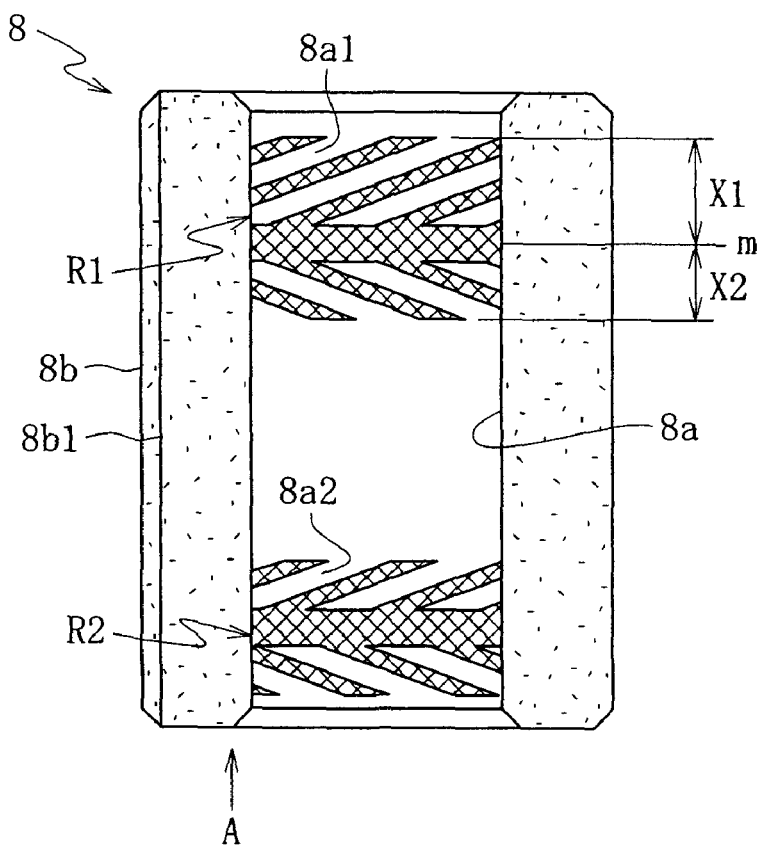
FIG. 3A is a sectional view of a bearing sleeve.

As shown in FIG. 2, on the inner peripheral surface 8a of the bearing sleeve 8, there are provided upper and lower areas constituting the radial bearing surfaces of the first radial bearing portion R1 and the second radial bearing portion R2 so as to be axially spaced apart from each other. In those two areas, there are respectively formed dynamic pressure grooves 8a1 and 8a2 of a herringbone-like configuration as shown, for example, in FIG. 3. The upper dynamic pressure grooves 8a1 are formed axially asymmetrical with respect to the axial center m (the axial center of the region between the upper and lower inclined grooves), and the axial dimension X1 of the region above the axial center m is larger than the axial dimension X2 of the region below the same. Further, on the outer peripheral surface 8b of the bearing sleeve 8, there is formed one or a plurality of axial grooves 8b1 so as to extend over the entire axial length thereof. In this embodiment, three axial grooves 8b1 are circumferentially formed at the same intervals.

Figure 3B:
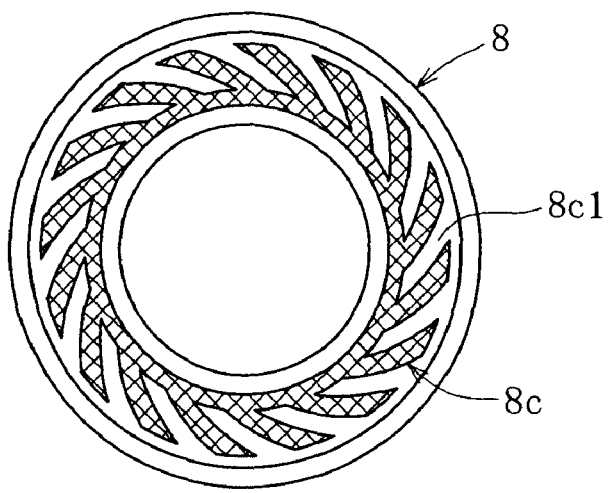
FIG. 3B is a bottom view of the bearing sleeve as seen in the direction of an arrow A of FIG. 3B.

In the region of the lower end surface 8c of the bearing sleeve 8 serving as the thrust bearing surface of the thrust bearing portion T2, there are formed spiral dynamic pressure grooves 8c1 as shown, for example, in FIG. 3(b).

Figure 4:
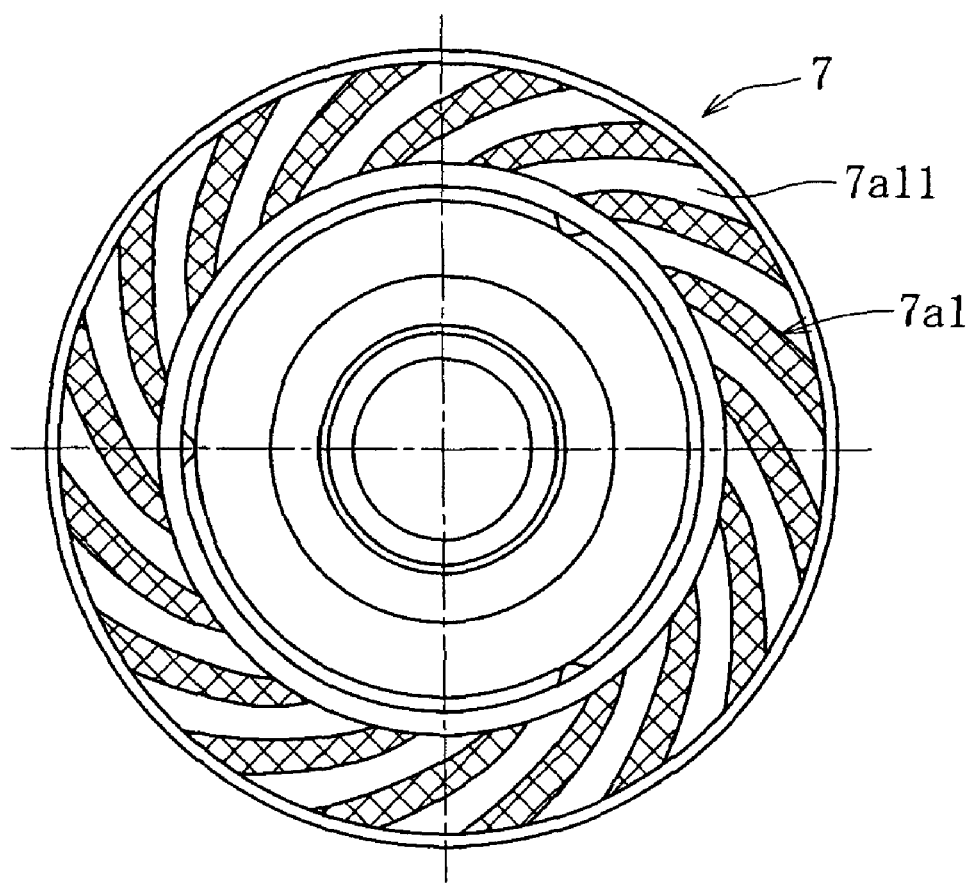
FIG. 4 is a top view of the housing as seen in the direction of an arrow B of FIG. 2.

The housing 7 is a resin molding, and is mainly formed by a cylindrical side portion 7a. In the region of the upper end surface 7a1 of the side portion 7a constituting the thrust bearing surface of the thrust bearing portion T1, there are formed spiral dynamic pressure grooves 7a11 as shown, for example, in FIG. 4. Those dynamic pressure grooves 7a11 are formed simultaneously with the formation of the side portion 7a by previously forming a molding pattern for the dynamic pressure grooves 7a11 in the surface of the mold for molding the upper end surface 7a1 of the housing, and by transferring the shape of the molding pattern to the upper end surface 7a1 of the side portion 7a at the time of formation of the side portion 7a.

Further, as shown in FIG. 2, in the outer periphery of the side portion 7a, there is formed a tapered outer wall 7b gradually diverging upwards. Between this tapered outer wall 7b and the inner peripheral surface 9b1 of the cylindrical portion 9b, there is formed an annular seal space S whose radial dimension is gradually reduced upwards from the lower end of the housing 7. The seal space S communicates with the outside diameter side of the thrust bearing clearance of the thrust bearing portion T1 when the shaft portion 2 and the hub portion 9 rotate.

At the lower end of the side portion 7a, there is formed a press-fit portion 7c, into which the bottom member 10 is press-fitted. The diameter of the inner peripheral surface 7c1 of the press-fit portion 7c is larger than the diameter of the inner peripheral surface 7d to which the bearing sleeve 8 is fixed, and the wall thickness of the press-fit portion 7c is smaller than that of the side portion 7a situated above the same. Further, the outer periphery of the housing 7 (the outer periphery of the side portion 7a) is fixed to the inner periphery of the motor bracket 6. Apart from the construction in which the side portion 7a and the bottom member 10 are separate members as described above, the housing 7 may also be of a construction in which they are integrally formed (not shown).

Further, it is also possible to form the housing 7 and the bearing sleeve 8 integrally of resin, with dynamic pressure generating means (e.g., dynamic pressure grooves) being provided in the region where this member, the shaft portion 2, and the flange portion 11 fixed to the lower end of the shaft portion 2 are opposed to one another.

Although the housing 7 is a resin molding, it is possible to use, as the base resin, polyphenylene sulfide (PPS), polyetheretherketone (PEEK), polyethersulfone (PES), polyphenylsulfone (PPSF), polyamideimide (PAI), etc., taking into account oil resistance, water absorption resistance, heat resistance, etc.

Above all, from the viewpoint, in particular, of cost and fluidity (viscosity) during molding, polyphenylene sulfide (PPS) is preferable. Incidentally, polyphenylene sulfide (PPS), which is generally produced through condensation polymerization reaction of sodium sulfide and paradichlorobenzene, includes sodium chloride as a byproduct at the same time. Thus, by using, for example, an appropriate solvent, the polyphenylene sulfide (PPS) needs to be washed. It is only necessary for the solvent for washing the polyphenylene sulfide (PPS) to be the one having a dielectric constant of at least 10 or more, preferably, 20 or more, and more preferably, 50 or more. Further, also taking the environmental factor into account, it is desirable to use, for example, water (dielectric constant: about 80), in particular, ultrapure water. By effecting washing with such a solvent, the Na of the polyphenylene sulfide (PPS) terminal group is removed, so it is possible to reduce mainly the Na content of the polyphenylene sulfide (PPS) (for example, by 2000 ppm or less), making it possible to use it as the resin material for forming the housing 7. Further, by removing the Na of the terminal group, it is advantageously possible to expedite the crystallization rate.

Polyphenylene sulfide (PPS) can be roughly classified into: cross-linking polyphenylene sulfide (PPS), semi-linear type polyphenylene sulfide (PPS) with few side chains, and straight-chain type (linear type) polyphenylene sulfide (PPS) with still fewer side chains. Of these, linear type polyphenylene sulfide (PPS), which has the least side chains, is more preferable in that it has a small number of molecular terminal groups per molecule and a small Na content. Further, as compared with other types of polyphenylene sulfide (PPS), linear type polyphenylene sulfide (PPS) is preferable in that it is easy to wash linear type polyphenylene sulfide (PPS) or that it is not necessary to reduce Na ion content through washing. Regarding the ion content concentration, the one with an Na content of 2,000 ppm or less, more preferably, the one with an Na content of 1,000 ppm or less, and most preferably, the one with an Na content of 500 ppm or less corresponds to the above-mentioned linear type polyphenylene sulfide (PPS). By using this type of polyphenylene sulfide (PPS), it is possible to suppress the amount of Na ions eluted into the lubricating oil, so that it is possible to prevent deposition of Na ions on the dynamic bearing device 1, the disc-like information recording medium retained by the rotary member 3, or the surface of the disc head (not shown).

Carbon fibers can be mixed with the above-mentioned base resin as a filler. This makes it possible to enhance the strength of the housing 7, and to suppress dimensional changes as a result of changes in the temperature of the housing 7 to thereby obtain high dimensional stability. As a result, it is possible to control with high accuracy the radial bearing clearance and the thrust bearing clearance during use, thus making it possible to ensure the requisite bearing performance. Further, by mixing carbon fibers with the base resin, the high conductivity of the carbon fibers is exerted, making it possible to endow the housing 7 with sufficient conductivity (e.g., $10^7$ Ω·cm or less in terms of volume resistance). As a result, it is possible to dissipate the static electricity with which the disk is charged during use to the grounding side member (motor bracket 6, etc.) through the rotary member 3 and the housing 7 (in some cases, in addition thereto, through the shaft sleeve 8).

While various types of carbon fibers such as PAN type or Pich type can be used, from the viewpoint of reinforcing effect (requisite tensile strength for the molding is 120 MPa) and impact absorbing property, carbon fibers with relatively high tensile strengths (preferably 3000 MPa or more) are preferable; in particular, as carbon fibers also having high conductivity, PAN type carbon fibers are preferable.

As the PAN type carbon fiber, it is possible to use one in the following dimensional range.

(1) When kneading the molten resin for injection molding, the carbon fibers are cut into short fibers. When this process progresses, a deterioration in strength, conductivity etc. becomes conspicuous, making it difficult to satisfy the requisite characteristics. Thus, taking into account the breakage of the fibers at the time of molding, it is desirable to use relatively long fibers as the carbon fibers to be mixed with the resin; specifically, it is desirable to use carbon fibers whose average fiber length is 100 μm or more (more preferably, 1 mm or more).

(2) On the other hand, in the injection molding process, a portion of resin hardened in the mold may be extracted and melted again to be kneaded with a virgin resin composition for re-use (recycling). In this case, a part of the fibers are repeatedly recycled, so that, when the original fiber length is too large, the fiber length becomes markedly shorter than the original fiber length due to the cutting during recycling, with the result that changes in the characteristics of the resin composition (reduction in melting viscosity, etc.) become conspicuous. To minimize such changes in characteristics, it is desirable for the fiber length to be as small as possible; more specifically, it is desirable for the average fiber length to be not more than 500 μm or less (more preferably, 300 μm or less).

The selection of the fiber length of the carbon fibers as mentioned above can be determined according to the history of the resin composition used in the actual injection molding process. For example, when using only a virgin resin composition, or when using it mixed with a recycled resin composition and when the proportion of the virgin resin composition is larger, it is desirable to use carbon fibers of the dimensional range as mentioned in the above (1) from the viewpoint of suppressing a reduction in strength, conductivity, etc.; conversely, when the proportion of the use of the recycled resin composition is larger, it is desirable to use carbon fibers in the dimensional range as mentioned in the above (2) from the viewpoint of suppressing the changes in the characteristics of the resin composition due to the recycling.

In either of the type (1) carbon fibers and the type (2) carbon fibers, the number of fibers mixed increases with a reduction in the diameter of the carbon fibers, which is effective in uniformalizing the product quality, and, the larger the aspect ratio, the higher the reinforcing effect of the fiber reinforcement. Thus, the larger the aspect ratio of the carbon fibers, the more desirable it is; more specifically, an aspect ratio of 6.5 or more is preferable. Taking into consideration the operability and availability of the fibers, an appropriate average fiber diameter is 5 to 20 μm.

To exert the reinforcing effect, static electricity removing effect, etc. due to the above-mentioned carbon fibers to a sufficient degree, it is desirable for the filling amount of carbon fibers with respect to the base resin to be 10 to 35 vol %, more preferably, 15 to 25 vol %. When the filling amount of carbon fibers is less than 10 vol %, the reinforcing effect, static electricity removing effect, etc. due to the carbon fibers cannot be exerted to a sufficient degree; further, the requisite wear resistance of the portion of the housing 7 sliding on another component is not ensured, whereas, when the filling amount exceeds 35 vol %, the formability of the housing 7 deteriorates, making it impossible to obtain high dimensional accuracy.

Since the cavity is filled with molten resin with high accuracy, it is desirable for the melting viscosity of the resin composition formed of a base resin mixed with a filler, such as carbon fibers, to be suppressed to a level of not more than 500 Pa·s at a temperature of 310° C. and a shear rate of $1,000\ s^{-1}$. Thus, also from the viewpoint of compensating for the increase in viscosity due to filling with the filler, it is desirable for the melting viscosity of the base resin to be not more than 100 Pa·s at a temperature of 310° C. and a shear rate of $1,000\ s^{-1}$.

In this way, when a polyphenylene sulfide (PPS) is used as the base resin of the housing 7, it is possible to form a housing 7 endowed with high oil resistance, low ion elution property, low water absorption property, and high heat resistance, so that it is possible to maintain a high level of cleanliness for the dynamic bearing device 1 and the disk drive device in which the dynamic bearing device 1 is incorporated. Further, by injecting a resin composition mixed with an appropriate amount of carbon fibers of PAN type, etc. into a mold to thereby form the housing 7, it is possible to obtain a housing 7 superior in strength, dimensional stability, static electricity removing property, and formability.

The housing 7 as completed can be used regardless of its size and be suitably used for a magnetic disk drive device, such as a hard disk drive (HDD), in a state in which the housing 7 is incorporated into the dynamic bearing device 1.

A first embodiment of the present invention is described above, but the above-described embodiment of the present invention should not be construed restrictively.

For example, while in the example shown in FIG. 2 the thrust bearing portion T1 is formed between the upper end surface 7a1 of the housing and the hub portion 9, it is also possible to form the thrust bearing portion between the upper end surface 10a of the bottom member 10 and the lower end surface 11b of the flange portion 11. Further, while in the above-described embodiment carbon fibers are mixed with one kind of base resin (polyphenylene sulfide), it is also possible to add an organic substance such as some other thermoplastic resin or thermosetting resin or a rubber component as long as the effect of the present invention is not thereby impaired; further, in addition to the carbon fibers, it is possible to add an inorganic substance, such as metal fibers, glass fibers, or whiskers. For example, polytetrafluoroethylene (PTFE) can be added as a releasing agent, and carbon black can be added as a conductifying agent.

Example 1

To clarify the usefulness of the present invention, a plurality of resin compositions of different compositions were evaluated in terms of the requisite characteristics of the housing 7. As the base resin, one of different kinds of polyphenylene sulfide (PPS) (one kind of linear type resin and two kinds of cross-linking type resins), polyethersulfone (PES), and polycarbonate (PC) was used. As the filler to be mixed with the base resin, one of three kinds of carbon fibers (two kinds of PAN type fibers and one kind of Pich type fibers) differing in fiber diameter and fiber length (differing in aspect ratios), as shown in FIG. 5A, was used. FIG. 5B shows examples of a combination and mixing ratio of these base resins and fillers (carbon fibers).

In this example: as the linear type polyphenylene sulfide (PPS), LC-5G manufactured by DAINIPPON INK AND CHEMICALS, INC. was used; as the two kinds of cross-linking polyphenylene sulfide (cross-linking PPSs No. 1 and No. 2), there were used T-4 manufactured by DAINIPPON INK AND CHEMICALS, INC. and MB-600 manufactured by DAINIPPON INK AND CHEMICALS, INC., respectively; as the polyether sulfone (PES), 4100G manufactured by Sumitomo Chemical Co., Ltd. was used; and as the polycarbonate (PC), S-2,000 manufactured by Mitsubishi Engineering-Plastics Corp. was used. As the two kinds of PAN type carbon fibers (No. 1 and No. 2), there were used HM35-C6S manufactured by Toho Tenax Co., Ltd. MLD-1000 manufactured by Toray Industries, Inc., respectively, and as the one kind of Pich type carbon fibers (No. 1), there are used K223NM manufactured by Mitsubishi Chemical Corporation. Further, in this example, polytetrafluoroethylene (PTFE) was used as the releasing agent; more specifically, KTL-620 manufactured by Kitamura Kabushiki Kaisha was used.

The items of evaluation for the specimens are six items, which are: (1) Na ion content [ppm], (2) Na ion elution amount [μg/cm$^2$], (3) volume resistance [Ω·cm], (4) oil resistance (decreasing rate of tensile strength) [%], (5) wear depth of the ring [μm], and (6) wear depth of the associated member on which sliding occurs [μm]. The evaluation methods for the above items (the methods of measuring the evaluation item values) and acceptability criterion are as follows.

(1) Na Ion Content [ppm]

The specimen (resin bulk body) was incinerated by the sulfuric acid incineration method, and was then dissolved in diluted hydrochloric acid to measure the Na ion concentration by an atomic absorption spectro photometer. The specific procedures are as follows: <1> 0.10 of the specimen is weighed accurately, and 0.3 g of undiluted sulfuric acid is collected in a platinum plate. <2> In a drafter, the specimen is heated and carbonized on an electric heating ceramic plate, and a muffle is placed thereon to heat until no smoke comes out. <3> The platinum plate is transferred to a muffle electric furnace of 700° C. (high temperature furnace), and is further heated for 40 minutes to completely incinerate the specimen. <4> After incineration, 10 cc of 1.2 N hydrochloric acid is added to the cooled specimen to dissolve the ash content. <5> This is transferred into a polyethylene measuring flask and dissolved by adding ion exchange water (to obtain a prepared solution). <6> A prepared secondary standard solution in which an Na standard solution was diluted to a predetermined amount is separately prepared, and, based on this prepared standard solution, the Na ion concentration coefficient is obtained by an atomic absorption spectro photometer (including a data processing device). <7> The Na ion content concentration of the specimen was measured by using the atomic absorption spectro photometer based on the prepared solution prepared in procedure <5>. <8> Measurement is performed three times with different specimens to obtain the average value. It is noted that, as an acceptability criterion, 2000 ppm or less is regarded as pass (o), and more than 2000 ppm is regarded as rejection (x).

(2) Na Ion Elution Amount [μg/cm$^2$]

The Na ion elution amount of the specimen (housing) after insert molding was measured by ion chromatography. The specific procedures are as follows. <1> A predetermined amount of ultrapure water is put in an empty beaker, and a specimen whose surface area has been calculated previously is put in it. <2> The beaker is set in an ultrasonic washing machine for a predetermined time to cause the ions contained in the surface and interior of the specimen to be eluted into the ultrapure water. Apart from this, a beaker containing solely pure water and in which no specimen is put is also set in the ultrasonic washing machine for a predetermined period of time to prepare a blank. It is desirable for the ultrasonic washing machine used here to be of a frequency ranging from 30 to 50 kHz and of an output of approximately 100 to 150 W. <3> The Na ion amount contained in the ultrapure water in which the specimen is put, prepared as described above, is measured by ion chromatography (measurement value A). Apart from this, the Na ion amount contained in the blank is also measured in a similar fashion (measurement value B). <4> The value obtained by subtracting measurement value B from measurement value A is regarded as the Na ion concentration per 1 ml of the ultrapure water containing the specimen, and this value is multiplied by the ultrapure water amount used in the ion elution and is divided by the sample surface area to obtain the Na ion elution amount per unit surface area [μg/cm$^2$]. It is noted that, as an acceptability criterion, 0.01 μg/cm$^2$ or less is regarded as pass (o), and more than 0.01 μg/cm$^2$ is regarded as rejection (x).

(3) Volume Resistance [Ω·cm]

Measurement was performed by the four-point probe method according to JIS K 7194. It is noted that, as an acceptability criterion, $10^7$ Ω·cm or less is regarded as pass (o), and more than $10^7$ Ω·cm is regarded as rejection (x).

(4) Oil Resistance (Tensile Strength Reduction Rate) [%]

A dumb-bell No. 1 defined by JIS K7113 is soaked into lubricating oil, and is immersed in a constant temperature bath having temperature of 120° C. to measure the tensile strength until 1000 h, per 100 h and the tensile strength reduction rate of the sample with respect to the tensile strength of the sample at the start is obtained. The lubricating oil used was di(2-ethylhexyl)azelate as a diester oil. The tensile strength measurement is performed by a method defined by JIS K7113, and the reduction rate is calculated from a formula shown below.

[(tensile strength at the time of examination start)−(tensile strength at each measuring time)/(tensile strength at the time of examination start)]×100
[unit: %]

It is noted that, as an acceptability criterion, after 1000 h from the start of the immersion, the reduction rate of 10% or less is regarded as pass (o), and more than 10% is regarded as rejection (x).

(5) Wear depth of the ring [μm] and (6) Wear depth of the associated member on which sliding is effected [μm]

Measurement was performed by a ring-on-disc test, in which a ring-like specimen is pressed against a disc-like associated sliding member with a predetermined load in lubricating oil and, in this state, the specimen side is rotated. More specifically, a ring-like resin molding of Ø21 mm (outer diameter)×Ø17 mm (inner diameter)×3 mm (thickness) was used as the specimen. Further, as the associated sliding member, A5056 disc member with a surface roughness of Ra 0.04 μm and with a size of Ø30 mm (diameter)×5 mm (thickness) was used. The lubricating oil used was di (2-ethylhexyl) azelate as a diester oil. The kinematic viscosity of this lubricating oil at 40° C. is 10.7 mm$^2$/s. During the ring-on-disc test, the surface pressure of the associated sliding member with respect to the specimen was 0.25 MPa, the rotating speed (peripheral speed) was 1.4 m/min., the test time was 14 hours, and the oil temperature was 80° C. It is noted that, as an acceptability criterion, regarding the wear depth of the ring, 3 μm or less is regarded as pass (o), and more than 3 μm is regarded as rejection (x), and regarding the wear depth of the associated member on which sliding is effected, 2 μm or less is regarded as pass (o), and more than 2 μm is regarded as rejection (x).

FIG. 6 shows evaluation results on each specimen regarding the evaluation items (1) through (6). When, as in Comparative Example 1, the mixing ratio of the carbon fibers is small (<10 vol %), not only is the volume resistance of the specimen insufficient, but the requisite wear resistance of the ring cannot be secured. When, as in Comparative Example 2, the mixing ratio of the carbon fibers is large (>35 vol %), the requisite wear resistance of the associated member on which sliding is effected cannot be secured. In the examples in which, as in Comparative Example 3, cross-linked polyphenylene sulfide (PPS) is used as the base resin, there were detected eluted Na ions in an amount so large that their adverse influence on the lubricating oil, etc. is not negligible. In the examples in which, as in Comparative Example 4, polyether sulfone (PES) is used as the base resin, it is impossible to secure the requisite wear resistance of the ring. In the examples in which, as in Comparative Example 5, polycarbonate (PC) is used as the base resin, the requisite oil resistance is not satisfied; nor is it possible to secure the requisite wear resistance of the ring. In contrast, in Mixing Examples 1 through 4 according to the present invention, the results obtained were superior to those of Comparative Examples in all aspects, such as cleanliness (Na ion elution amount), static electricity removing property (volume resistance), oil resistance (tensile strength reduction rate), and wear resistance (wear depth of the ring and the associated member).

Figure 7:
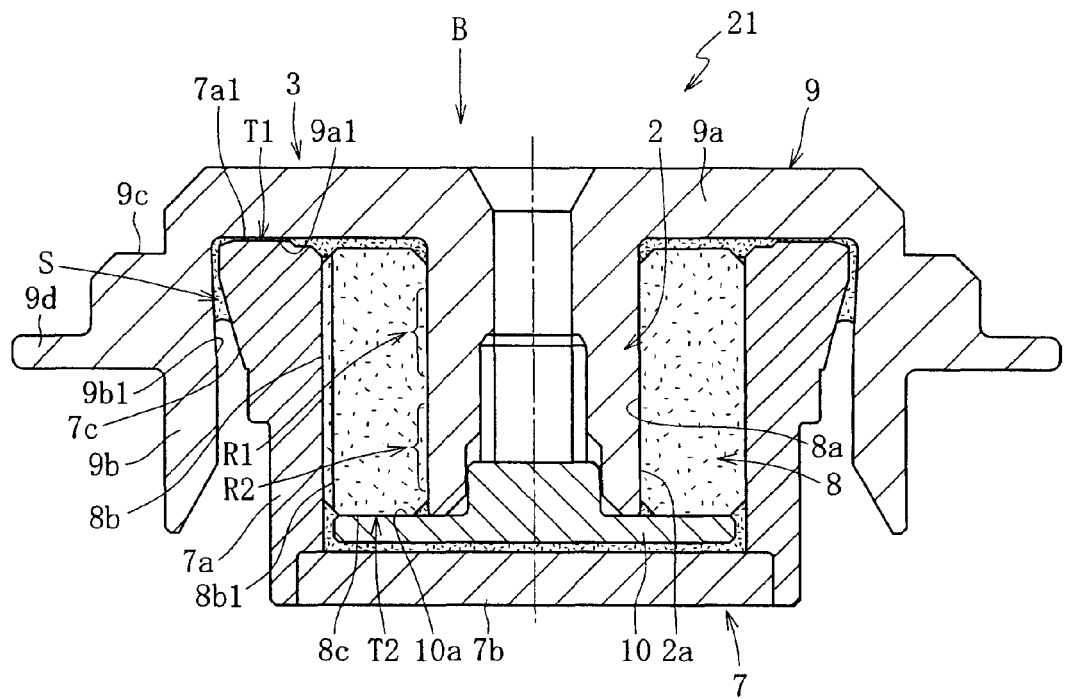
FIG. 7 is a sectional view of a dynamic bearing device according to a second embodiment of the present invention.

FIG. 7 shows a dynamic bearing device 21 according to the second embodiment. The dynamic bearing device 21 is equipped with the housing 7, the bearing sleeve 8 fixed inside the housing 7, and the rotary member 3 rotatable relative to the housing 7 and the bearing sleeve 8. For the sake of convenience, in the following description, the opening side of the housing 7 will be referred to as the upper side, and the side opposite thereto will be referred to as the lower side.

The rotary member 3 is composed, for example, of a hub portion 9 capping the opening side of the housing 7, and the shaft portion 2 inserted into the inner periphery of the bearing sleeve 8.

The hub portion 9 is equipped with a disc-shaped portion 9a covering the opening side of the housing 7, a cylindrical portion 9b extending axially downwards from the outer peripheral portion of the disc-shaped portion 9a, a disk mounting surface 9c provided in the outer periphery of the cylindrical portion 9b, and a flange portion 9d. A disk-like information recording medium (not shown) is fitted onto the outer periphery of the disc-shaped portion 9a, and is placed on the disk mounting surface 9c. The disk-like information recording medium is retained on the hub portion 9 by appropriate retaining means (not shown).

In this embodiment, the shaft portion 2 is formed integrally with the hub portion 9, and, at the lower end of the shaft portion 2, there is provided a separate flange portion 10 serving as a detachment preventing means. The flange portion 10 is formed of metal, and is fixed to the shaft portion 2 by connecting means, such as a screw.

The bearing sleeve 8 is formed in a cylindrical configuration using a porous material formed of, for example, a sintered metal, in particular, a sintered metal whose main component is copper.

On the inner peripheral surface 8a of the bearing sleeve 8, there are provided upper and lower areas constituting the radial bearing surfaces of the first radial bearing portion R1 and the second radial bearing portion R2 so as to be axially spaced apart from each other. In those two areas, there are respectively formed dynamic pressure grooves 8a1 and 8a2 of a herringbone-like configuration as shown, for example, in FIG. 3A. The upper dynamic pressure grooves 8a1 are formed axially asymmetrical with respect to the axial center m (the axial center of the region between the upper and lower inclined grooves), and the axial dimension X1 of the region above the axial center m is larger than the axial dimension X2 of the region below the same. Further, on the outer peripheral surface 8b of the bearing sleeve 8, there is formed one or a plurality of axial grooves 8b1 so as to extend over the entire axial length thereof. In this embodiment, three axial grooves 8b1 are circumferentially formed at the same intervals.

In the region of the lower end surface 8c of the bearing sleeve 8 serving as the thrust bearing surface of the thrust bearing portion T2, there are formed dynamic pressure grooves 8c1 as shown, for example, in FIG. 3B.

The housing 7 is equipped with a cylindrical side portion 7a, and a bottom portion 7b positioned at the lower end side of the side portion 7a, and at least the side portion 7a is formed of a resin material. In the region of the upper end surface 7a1 of the side portion 7a constituting the thrust bearing surface of the thrust bearing portion T1, there are formed dynamic pressure grooves 7a11 as shown, for example, in FIG. 4. Those dynamic pressure grooves 7a11 are formed simultaneously with the formation of the side portion 7a by previously forming a molding pattern for the dynamic pressure grooves 7a11 in the surface of the mold for molding the side portion 7a of the housing 7, and by transferring the shape of the molding pattern to the upper end surface 7a1 of the side portion 7a at the time of formation of the side portion 7a.

At the bottom of the side portion 7a, the bottom portion 7b formed separately from the side portion 7a is mounted afterwards. The bottom portion 7b is formed of a metallic material or a resin material. In the former case, the bottom portion 7b is fixed to the side portion 7a by means of adhesion (including press-fit adhesion). In the latter case, besides the adhesion, the bottom portion 7b is fixed to the side portion 7a by means of ultrasonic welding, laser welding, or the like.

Further, in the outer periphery of the side portion 7a, there is formed a tapered outer wall 7c gradually diverging upwards. Between this tapered outer wall 7c and the inner peripheral surface 9b1 of the cylindrical portion 9b, there is formed an annular seal space S whose radial dimension is gradually reduced upwards from the bottom portion 7b side of the housing 7. The seal space S communicates with the outside diameter side of the thrust bearing clearance of the thrust bearing portion T1 when the shaft portion 2 and the hub portion 9 rotate.

The interior of the dynamic bearing device 21, inclusive of the inner voids of the bearing sleeve 8 (the voids of the porous texture), is filled with lubricating oil. The surface level of the lubricating oil is always maintained within the seal space S. As the lubricating oil, various oils can be used. In particular, low evaporation rate and low viscosity are required of the lubricating oil used in a dynamic bearing device for an apparatus for driving a recording disk, such as a hard disk. As the lubricating oil, ester type lubricating oils, such as dioctyl sebacate (DOS) and dioctyl azetate (DOZ), are preferable.

The housing 7 (the side portion 7a in this embodiment) is required to have high oil resistance (low oil absorbency) with respect to the above ester type lubricating oils. Apart from this, it is necessary to keep the out gas generation amount and water absorbing amount at the time of solidification at a low level. Further, high heat resistance is also required.

As a resin satisfying the above requisite characteristics, it is possible to use, for example, polyetheretherketone (PEEK), polyphenylene sulfide (PPS), polyamide (PA), thermoplastic polyimide (TPI), or polybutylene terephthalate (PBT). These resins help to obtain a housing 7 superior in cleanliness, dimensional stability, and heat resistance. Of these, taking into consideration the cost and the fluidity (viscosity) at the time of molding, polyphenylene sulfide (PPS) and polyamide (PA) are more preferable. Further, of various types of polyamide, an aromatic polyamide, in particular, which exhibits low water absorbency and satisfactory dimensional stability, is to be regarded as a more preferable resin. As an example of the aromatic polyamide, it is possible to mention PA9T, which is Genestar manufactured by KURARAY CO., LTD.

The resin material using one of the resins selected from the above resins is mixed with at least one of carbon fibers and inorganic fibers as the filler. This helps to reinforce the housing 7, and to suppress dimensional changes in the housing 7 due to temperature changes, thereby obtaining high dimensional stability. It is desirable for the filler to be contained in the housing 7 in an amount of 15 to 50 wt % in total. This is for the reason that, when the lower limit value of the above numerical value range is not exceeded, the dimension stabilizing effect cannot be exerted to a sufficient degree, and when the upper limit value is exceeded, the fluidity of the resin in the mold deteriorates, adversely affecting the formability of the housing 7.

As the inorganic fibers, it is desirable, in particular, to adopt ones containing no silicon (Si); for example, potassium titanate whiskers, zinc oxide whiskers, aluminum borate whiskers, etc. are preferable. This is for the reason that, when inorganic fibers containing silicon (Si) are used as the filler, there is a fear of the gasified organic Si being re-crystallized and adhering to the bearing device, the surface of the hard disk, etc., thereby deteriorating the cleanliness of the bearing device and the periphery thereof. From the viewpoint of maintaining a satisfactory level of fluidity of the resin material in the mold, it is desirable to keep the mixing amount of the inorganic fibers at a level not higher than 40 wt %.

When the housing is molded using carbon fibers as the filler, the carbon fibers partially protrude from or are exposed on the molding surface of the housing 7. Thus, when the housing 7 contains carbon fibers, air trapped in the resin material when pouring the resin material into the mold is dissipated to the exterior of the molding along the interface portion between the carbon fibers exposed on the molding surface of the resin molding and the resin around the carbon fibers. This helps to prevent generation of voids in the housing 7 and swelling of the housing 7, thus enhancing the formability of the housing 7. This venting action due to the carbon fibers is exerted to a sufficient degree when carbon fibers are contained in the housing 7 in an amount of not less than 1 wt %. When the mixing amount of the carbon fibers exceeds 40 wt %, it becomes difficult to keep the formability and dimensional stability of the housing 7 at a satisfactory level, so that the mixing amount of the carbon fibers is preferably kept not larger than 40 wt %.

The upper end surface 7a1 of the housing 7 constituting the thrust bearing surface and the lower end surface 9a1 of the hub portion 9 (rotary member 3) are in sliding contact with each other when the dynamic bearing device 1 starts to rotate or is at rest. Taking into consideration the wear resistance at this time, it is desirable for the content of the carbon fibers in the housing 7 to be 5 to 35 wt %. This is for the reason that, in order for the effect of improving the wear resistance of the housing 7 to be exerted to a sufficient degree, at least 5 wt % of carbon fibers are necessary, and that, in order to secure sufficient expansion when press-fitting another component (e.g., the bottom portion 7b) into the housing 7, it is necessary to keep the above-mentioned content at a level not larger than 35 wt %.

Apart from the carbon fibers and inorganic fibers, it is possible to mention, for example, a powdered conductifying agent, such as carbon black, as a filler that can be mixed with the resin material forming the housing 7. It is desirable for carbon black to be contained in the housing 7 in an amount ranging from 2 to 10 wt %; due to this arrangement, static electricity generated, for example, during rotation of the rotary member 3 is dissipated to the ground side member (the motor bracket 6 in this embodiment), whereby it is possible to prevent charging of other components (e.g., the head of the hard disk). Further, during assembly of the dynamic bearing device 1, components, such as the housing 7, may be charged with static electricity, causing dust to adhere thereto. However, when, as described above, static electricity removing property is imparted to the housing 7, it is possible to prevent dust from adhering to the components and to maintain cleanliness in the dynamic bearing device 1. Usually, carbon black is contained in the housing 7 in a state in which the particles are agglomerated, and, by melting and kneading the spool and runner portions at the time of molding of the housing 7 for the purpose, for example, of recycling, the agglomerated particles are dispersed. Thus, even if the recycling of the waste material of the housing 7 is repeated, the conductivity of the housing 7 is not deteriorated.

When the housing 7 includes a portion to be welded to another component (e.g., the bottom portion 7b), the total amount of the filler contained in the housing 7 is kept at a level not more than 35 wt %, whereby it is possible to secure a sufficient welding force with which the welding to the other component is to be effected while maintaining the formability and dimensional stability of the housing 7.

In this way, by forming the housing 7 of the resin material as mentioned above, it is possible to form a housing having high oil resistance, low out gas property, low water absorbency, and high heat resistance, which makes it possible to maintain a high level of cleanliness in the dynamic bearing device 1 and the disk driving apparatus in which this bearing device is incorporated. Further, through, for example, injection molding of a resin material mixed with an appropriate amount of carbon fibers and inorganic fibers, or conductifying agent such as carbon black according to the use, it is possible to obtain a housing 7 superior in formability, dimensional stability, and static electricity removing property.

When the rotary member 3 (the shaft portion 2) of the dynamic bearing device 21 rotates, the two upper and lower regions of the inner peripheral surface 8a of the bearing sleeve 8 constituting the radial bearing surfaces are opposed to the outer peripheral surface 2a of the shaft portion 2 through the intermediation of the radial bearing clearance. As the shaft portion 2 rotates, the lubricating oil filling the radial bearing clearance generates a dynamic pressure action, and, by the pressure thereof, the shaft portion 2 is rotatably supported in the radial direction in a non-contact manner. As a result, there are structured a first radial bearing portion R1 and a second radial bearing portion R2 rotatably supporting the rotary member 3 in the radial direction in a non-contact manner. Further, a thrust bearing clearance is formed between the upper end surface 7a1 of the side portion 7a of the housing 7 and the lower end surface 9a1 of the hub portion 9 integrally formed with the shaft portion 2. As the rotary member 3 rotates, the lubricating oil filing the thrust bearing clearance generates a dynamic pressure action, and, by the pressure thereof, the rotary member 3 is rotatably supported in the thrust direction in a non-contact manner. As a result, there is structured a thrust bearing portion T1 rotatably supporting the rotary member 3 in the thrust direction in a non-contact manner. Similarly, a thrust bearing clearance is formed between the lower end surface 8c of the bearing sleeve 8 and the upper end surface 10a of the flange portion 10 of the shaft portion 2, and a dynamic pressure action of the lubricating oil is generated in this thrust bearing clearance, forming a second thrust bearing portion T2 supporting the rotary member 3 in the thrust direction in a non-contact manner.

The second embodiment of the present invention is as described above. The present invention, however, is not restricted to this embodiment.

While in the second embodiment the thrust bearing surface having the dynamic pressure grooves 7a11 is provided at the upper end surface 7a1 of the side portion 7a of the housing 7 (the thrust bearing portion T1), and the thrust bearing surface having the dynamic pressure grooves 8c1 is provided at the lower end surface 8c of the bearing sleeve 8 (the thrust bearing portion T2), the present invention is also applicable to a dynamic bearing device which is solely provided with the thrust bearing portion T1. In this case, the shaft portion 2 has no flange portion 10 and exhibits a straight configuration. Thus, by forming the bottom portion 7b integrally with the side portion 7a of a resin material, the housing 7 can be formed as a bottomed cylinder.

Figure 8:
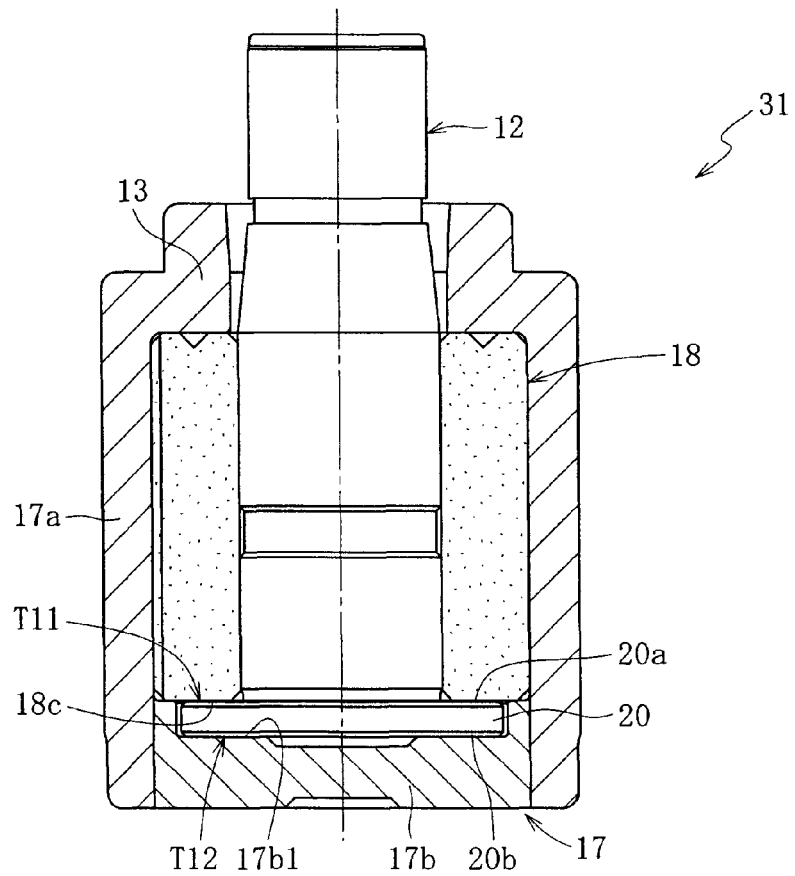
FIG. 8 is a sectional view of a dynamic bearing device according to a third embodiment of the present invention.

FIG. 8 shows a dynamic bearing device 31 according to the third embodiment. In this embodiment, a shaft portion (rotary member) 12 has, at the lower end thereof, a flange portion 20 provided integrally or separately. A housing 17 is equipped with a cylindrical side portion 17a, and a bottom portion 17b constituting a structure separate from the side portion 17a and situated at the lower end of the side portion 17a. At the upper end of the side portion 17a of the housing 17, there is formed a seal portion 13 protruding toward the inner periphery. Although not shown, dynamic pressure grooves of, for example, a spiral configuration are formed in the inner bottom surface 17b1 of the bottom portion 17b of the housing 17, and dynamic pressure grooves of a similar configuration are also formed in the lower end surface 18c of the bearing sleeve 18. And, a thrust bearing portion T11 is formed between the lower end surface 18c of the bearing sleeve 18 and the upper end surface 20a of the flange portion 20 of the shaft portion 12, and a thrust bearing portion T12 is formed between the inner bottom surface 17b1 of the bottom portion 17b of the housing 17 and the lower end surface 20b of the flange portion 20.

In this embodiment, the side portion 17a of the housing 17 is formed of a resin material together with the seal portion 13. Thus, by selecting a resin material and a filler similar to those of the first or second embodiment for the side portion 17a of the housing 17, it is possible to obtain a housing 17 superior in cleanliness, dimensional stability, formability, and static electricity removing property. When forming the bottom portion 17b of a resin material, it is possible to adopt a material composition similar to that of the side portion 17a. In this case, the bottom portion 17b is fixed to the side portion 17a by a means, such as ultrasonic welding. Thus, taking into consideration the weldability, it is desirable for the total amount of the filler in the side portion 17a of the housing 17 to be not more than 35 wt %.

Figure 9:
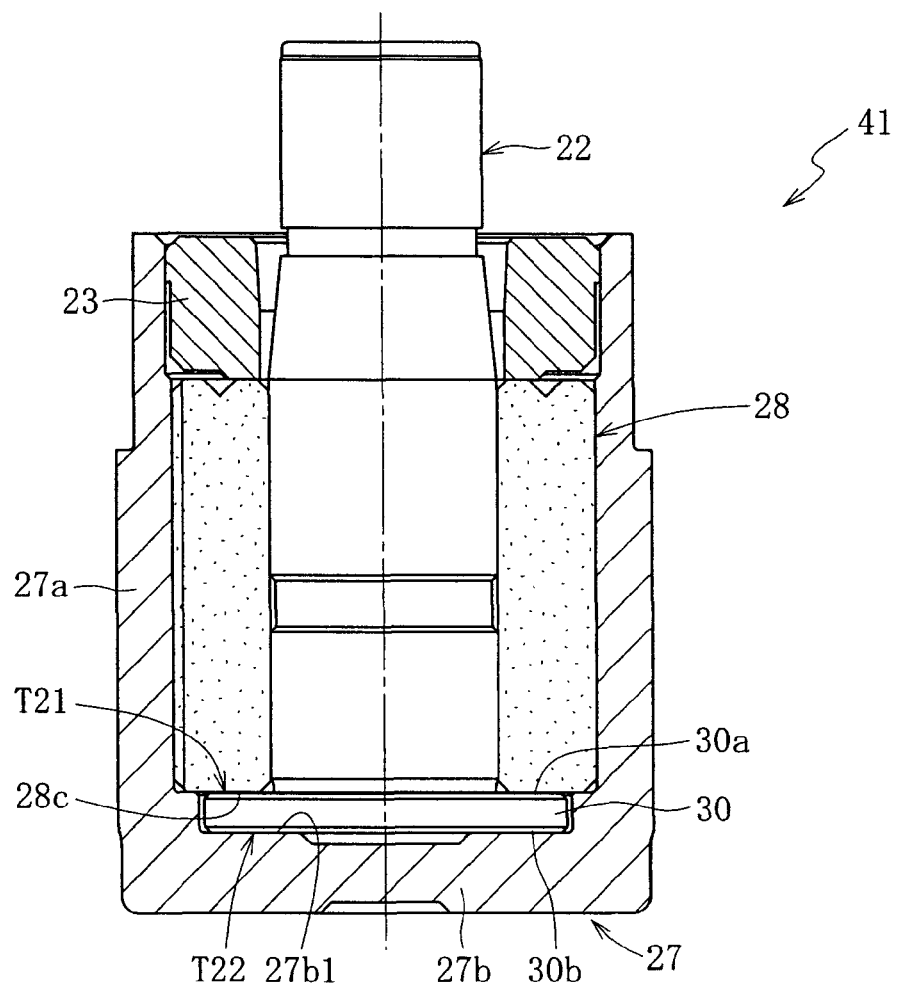
FIG. 9 is a sectional view of a dynamic bearing device according to a fourth embodiment of the present invention.

FIG. 9 shows a dynamic bearing device 41 according to the fourth embodiment. In this embodiment, a seal portion 23 is formed as a component separate from a side portion 27a of a housing 27, and is press-fitted into the inner periphery of the upper end portion of the housing 27 or fixed thereto by a means like welding. A bottom portion 27b of the housing 27 is formed integrally with the side portion 27a of the housing 27 of a resin material, and exhibits a bottomed-cylinder-shaped configuration. Otherwise, this embodiment is of the same construction as the third embodiment, so a description thereof will be omitted.

In this embodiment, the side portion 27a and the bottom portion 27b of the housing 27 are formed integrally of a resin material. Thus, by selecting a resin material and a filler similar to those of the first or second embodiment described above, it is possible to obtain a housing 27 superior in cleanliness, dimensional stability, formability, and static electricity removing property.

Example 2

To prove the utility of the present invention, housings 7 were formed using one of polyetheretherketone (PEEK), polyphenylene sulfide (PPS), and polyamide (PA) as the base material, and a material varying in the mixing ratio of carbon fibers, inorganic fibers (aluminum borate whiskers, zinc oxide whiskers), and carbon black as the filler, making comparison in terms of the requisite characteristics of the housings 7.

In this example, there were used H3110 manufactured by Shinnittetsu Chemical Ind. Co., Ltd. as the ester type lubricating oil, PEEK150P manufactured by Victrex MC Co., Ltd. as the polyetheretherketone (PEEK), Fotron 0220A9 manufactured by Polyplastics Co., Ltd. as the polyphenylene sulfide (PPS), Genesta N1000 manufactured by KURARAY CO., LTD. as the polyamide (PA), Besfite HTA-C6-E manufactured by Toho Tenax Co., Ltd. as the carbon fibers, Alborex Y manufactured by Shikoku Corp. as the aluminum borate whiskers, Panatetra WZ-0501 manufactured by Matsushita Electric Industrial Co., Ltd. as the zinc oxide whiskers, and Ketchen Black EC manufactured by Lion Corporation. as the carbon black. Further, in this example, polytetrafluoroethylene (PTFE) was mixed as the releasing agent. More specifically, KT-300M manufactured by Kitamura Kabushiki Kaisha was used.

FIG. 10 shows the results of a test on the housing 7 in which the mixing ratio of the filler, mainly the inorganic fibers (aluminum borate whiskers or zinc oxide whiskers) and carbon black, was varied. When, as in Comparative Examples 3, 4, and 6, the total amount of the filler exceeds 50 wt %, problems in terms of formability and expansion are involved independently of the kind of resin and filler. In contrast, in Mixing Examples 1 through 5 of the present invention, there were obtained results superior to those of Comparative Examples in terms of all aspects: formability, dimensional stability (small coefficient of linear expansion), static electricity removing property, and expansion. In Mixing Example 6, a venting effect for the interior of the resin material was to be observed.

FIG. 11 shows the results of a test on the housing 7 in which the mixing ratio of the fillers: carbon fibers, inorganic fibers (aluminum borate whiskers), and carbon black, was varied. Examples containing no carbon fibers like Comparative Examples 7 through 10 lack in wear resistance. Further, when, as in Comparative Example 12, the mixing amount of carbon fibers is too large (in excess of 35 wt %), the associated component (the rotary member 3, etc.) is damaged, resulting in a deterioration in wear resistance. In contrast, the examples containing 5 wt % or more of carbon fibers like Mixing Examples 7 through 10 exhibited satisfactory wear resistance.

What is claimed is:

1. A housing for a dynamic bearing device, the dynamic bearing device comprising a housing formed with dynamic pressure generating grooves, a bearing sleeve fixed to an inner periphery of the housing, a rotary member rotatable relative to the bearing sleeve and the housing, a lubricant oil filled in the dynamic bearing device, and a seal space within which a surface level of the lubricant oil is maintained,
wherein the lubricant oil is an ester-based lubricant oil, and
wherein the housing is formed of a resin composition containing a linear polyphenylene sulfide (PPS) as a base resin and polyacrylonitrile carbon fibers, the resin composition containing Na ions in an amount of 2000 ppm or less and having a melting viscosity of 500 Pa·s or less at a temperature of 310° C. and a shear rate of 1000 s$^{-1}$.

2. A housing for a dynamic bearing device according to claim 1, wherein the polyacrylonitrile carbon fibers have a tensile strength of 3000 MPa or more.

3. A housing for a dynamic bearing device according to claim 1, wherein the polyacrylonitrile carbon fibers have an aspect ratio of 6.5 or more.

4. A housing for a dynamic bearing device according to claim 1, wherein the polyacrylonitrile carbon fibers are contained in the resin composition in an amount of 10 to 35 vol %.

5. A dynamic bearing device comprising: a housing formed with dynamic pressure generating grooves; a bearing sleeve fixed to an inner periphery of the housing; a rotary member rotatable relative to the bearing sleeve and the housing; a lubricant oil filled in the dynamic bearing device; and a seal space within which a surface level of the lubricant oil is maintained,
wherein the lubricant oil is an ester-based lubricant oil, and
wherein the housing is formed of a resin composition containing polyphenylene sulfide (PPS) as a base resin and polyacrylonitrile carbon fibers, the resin composition containing Na ions in an amount of 2000 ppm or less and having a melting viscosity of 500 Pa·s or less at a temperature of 310° C. and a shear rate of 1000 s$^{-1}$.

6. A motor comprising: the dynamic bearing device according to claim 5; a rotor magnet; and a stator coil generating a magnetic force between the stator coil and the rotor magnet.

* * * * *

UNITED STATES PATENT AND TRADEMARK OFFICE
CERTIFICATE OF CORRECTION

PATENT NO. : 8,388,226 B2
APPLICATION NO. : 13/425083
DATED : March 5, 2013
INVENTOR(S) : Kazutoyo Murakami et al.

It is certified that error appears in the above-identified patent and that said Letters Patent is hereby corrected as shown below:

On the title page, Item (75) 3rd Inventor;
Change

"Eiichiro Shimizu"

To be

--Eiichiro Shimazu--

Signed and Sealed this
Twenty-eighth Day of May, 2013

Teresa Stanek Rea
*Acting Director of the United States Patent and Trademark Office*